(12) United States Patent
Lin et al.

(10) Patent No.: US 8,845,931 B2
(45) Date of Patent: Sep. 30, 2014

(54) NANOMETAL-POLYMER COMPOSITE CONDUCTIVE FILM AND METHOD FOR PREPARING THE SAME

(75) Inventors: Jiang-Jen Lin, Taipei (TW); Ying-Nan Chan, Taipei (TW); Wei-Li Lin, Taipei (TW)

(73) Assignee: National Taiwan University (TW)

( * ) Notice: Subject to any disclaimer, the term of this patent is extended or adjusted under 35 U.S.C. 154(b) by 233 days.

(21) Appl. No.: 13/279,394

(22) Filed: Oct. 24, 2011

(65) Prior Publication Data

US 2013/0056688 A1 Mar. 7, 2013

(30) Foreign Application Priority Data

Sep. 2, 2011 (TW) .............................. 100131782 A

(51) Int. Cl.
*H01B 1/02* (2006.01)
*H01B 1/22* (2006.01)
*B05D 5/12* (2006.01)

(52) U.S. Cl.
CPC ... *B05D 5/12* (2013.01); *H01B 1/22* (2013.01)
USPC ........ 252/514; 252/500; 174/126.2; 257/690; 257/753; 427/58; 427/126.3; 428/221

(58) Field of Classification Search
CPC ......................................................... C09D 5/00
USPC ........ 252/500, 514; 428/212, 221; 174/126.2; 257/690, 753; 427/58, 126.3
See application file for complete search history.

(56) References Cited

U.S. PATENT DOCUMENTS

2004/0253427 A1* 12/2004 Yokogawa et al. ............ 428/212

* cited by examiner

*Primary Examiner* — Khanh Tuan Nguyen
(74) *Attorney, Agent, or Firm* — Schmeiser, Olsen & Watts, LLP

(57) ABSTRACT

A method for preparing a nanometal-polymer composite conductive film includes the steps of (1) mixing a metal oxide with a polymer solution; (2) coating a substrate with a solution resulting from step (1), followed by drying the resultant solution to form a film; (3) performing thermal treatment on the film formed in step (2); and (4) sintering the film thermally treated in step (3). The method dispenses with any reducing agent or dispersing agent but allows nanometallic particles to be formed in situ and thereby reduces surface resistance of the polymer film efficiently.

8 Claims, 4 Drawing Sheets

NANOMETAL-POLYMER COMPOSITE CONDUCTIVE FILM AND METHOD FOR PREPARING THE SAME

CROSS-REFERENCE TO RELATED APPLICATION

This non-provisional application claims priority under 35 U.S.C. §119(a) on Patent Application No(s). 100131782 filed in Taiwan, R.O.C. on Sep. 2, 2011, the entire contents of which are hereby incorporated by reference.

FIELD OF TECHNOLOGY

This invention relates to a nanometal-polymer composite material, more particularly, relates to a nanometal-polymer composite conductive film and method for preparing the same.

BACKGROUND

Thermal, magnetic, photo sensitive properties and surface stability of nanoparticle are different from that of block material in normal condition because of properties of large specific surface area, number of surface atoms, surface energy and surface tension and small size effect, surface effect, quantum scale effect and macroscopic quantum tunnel effect, etc. Thus, it has widely application in photology, non-linear photology, electrology, magnetology and chemistry fields. Therefore, Nanotechnology has been sprung up like mushrooms. Relative products also have been introduced into daily life.

In numerous nanomaterial, inorganic nanopolymer obtains more and more attention. Although inorganic metal or ceramic material has properties of high strength, high rigidity, good thermal property and high hardness; it has disadvantages of poor moldability and difficult to process. The conventional inorganic nanomaterial is agglomeration easily because of low melting point and large specific surface area. As to the organic polymer material, it has good moldability and toughness; although thermal and mechanical properties are not as good as inorganic material. Therefore, mixing and dispersing the inorganic nanomaterial into the polymer substrate to form an inorganic nanopolymer composite material is applicable since it has improved properties of photology, thermal and activity of nanoparticles. Moreover, properties of toughness and easy process of the polymer are maintained.

However, nanoparticles need to be fabricated and fixed in the polymer base material or on the surface of the base material when preparing the inorganic nano-polymer composite material. For example, nanoparticles need to be fabricated in the polymer film or sol-gel film for photology, non-linear photology and sensor application. Solid base material is better for stable the nanoparticles comparing to the colloidal dispersion system, especially at high temperature. The interaction between nanoparticles and solid base material not only change the electronic state of the nanoparticles thereby changing physicochemical property, such as the surface plasma resonant absorption and catalytic activity, but also improve self-function of the base material (photo catalytic activity).

Currently, methods for preparing inorganic nanometal particles can be divided into physical method and chemical method. Nanometal particles can be obtained by the physical method directly; but special equipment and high vacuum environment are required. For example, the nanoparticals can be prepared by physical polishing the metal agglomerate, by metal ablation with laser to ablate the nanometal particle or deposited by physical vapor deposition (PVD). Nanoparticles prepared by the physical method have narrower particles distribution. However, more power are consumed for maintaining the reduce voltage, laser energy and vacuity during fabrication process. Thus, the chemical method was developed.

The Chemical method typically includes gas phase reaction and liquid precipitation. Gas phase reaction includes spraying method, which is preparing nanometal particles by spraying high pressure gas; pyroly decomposition method, which is preparing nanometal particles by decomposing the metal compound and gas reducing agent; and vapor/aggregation method, which is preparing nanometal particles by heating and evaporating the volatility material. Liquid precipitation includes sol-gel, hydrothermal, ultrasonic decomposition, micro emulsion and chemical reduction. Recently, the chemical reduction method, using a reducing agent, is widely used because of low pollution, high efficiency, low reaction temperature, simply procedure and easily to control the shape of the particles.

Chemical reduction method reduces the metal oxide to nanometal particles efficiently by the reducing agent at room temperature. Typical metal oxide includes copper chloride, nickel chloride, iron chloride, silver nitrate and chlorauric acid, for example. Typical reducing agent includes sodium citrate, ethylene diamine tetraacetic acid (EDTA), ethylene glycol, sodium borohydride, ascorbic acid, ethanol, dimethyl formamide (DMF), dimethyl acetamide (DMA), etc. However, nanoparticles, which is prepared by the chemical method, aggregated easily due to the coalescence between particles. Thus, a dispersing agent needs to be introduced to control the dispersibility and stability of the nanometal particles.

Currently, the dispersing agent can be divided into two types: surfactant and polymer. Surfactant is used to stabilize the nanometal particles by combining the functional group, such as amine, thiol, acid and alcohol, with the nanometal particles. Comparing to the surfactant, the structure and the functionality of the polymer are variable and easy to control. For example, the structure of the polymer includes linear, comb and branch, etc. The functionality of the polymer includes hydrophilic/hydrophobic, anion/cation, emulsibility and self-assembly. The nanometal particles can be grown stably and efficiently through the specific characteristics of the polymer. Some of the polymer and the solvent, such as polyvinyl alcohol (PVA), polyethylene glycol (PEG), polyvinyl pyrrolidone (PVP), ethylene glycol or DMF, etc., can be induced by thermal or light to have its own reducing ability. No additional reducing agent is needed. The nanometal particles can be prepared through its owned dispersing and stable effect. According to the research, the nanoparticles, obtained by utilizing the polymer as a dispersing agent, have advantage of uniform particle distribution, controllable particle size and easy to film.

Nanomaterial, which is recently developed rapidly and has important application, is AgNPs composite. It has widely application includes photoelectric, catalyst, conductive, biomedical sensor, drug release and quantum dot. However, the bottleneck of the applications is particles agglomeration easily and the concentration increasable inefficiently during fabrication. Therefore, the aspect of research is to minimum the agglomeration of the nanoparticles and prepare silver nanoparticle composite with variety shape.

Therefore, this invention desired to disclose a method dispenses with any reducing agent or dispersing agent but allows nanometallic particles to be formed in situ and thereby reduces surface resistance of the polymer film efficiently.

SUMMARY

Applicant realized that prior methods are not perfect and need to study hardly to overcome the disadvantages of the conventional technology above-mentioned. Relying on the experiment in this technology field, applicant developed a nanometal-polymer composite conductive film, which can decrease the surface resistance of the polymer film efficiently.

The aspect of this invention is to provide a method for preparing a nanometal-polymer composite conductive film, which can decrease the surface resistance of the polymer film efficiently.

To achieve the purpose above-mentioned, this invention provide a method for preparing a nanometal-polymer composite conductive film, comprising steps of:

(1) mixing evenly a metal oxide with a polymer solution;
(2) coating a substrate with a solution resulting from step (1), followed by drying the resultant solution to form a film;
(3) performing thermal treatment on the film formed in step (2); and
(4) sintering at high temperature the film thermally treated in step (3).

In the method above-mentioned, the proportion by weight of the metal oxide and the polymer is 1:99 to 50:50.

In the method above-mentioned, the proportion by weight of the polymer in the polymer solution is 10% to 20%.

In the method above-mentioned, the temperature for thermal treatment is from 50° C. to 150° C., and the duration is 0.5 h to 200 h.

In the method above-mentioned, the temperature for sintering is 250° C. to 350° C. and the duration for sintering is from 10 min to 60 min In the method above-mentioned, the polymer is selected from at least one of polyvinyl alcohol (PVA), polyethylene glycol (PEG), polyvinyl pyrrolidone (PVP), polyacrylonitrile (PAN), polyamide (PA), polyimide (PI), polyamide-imide (PAI), polyaniline (PAN), polyacrylic acid (PAA), polymethyl methacrylate (PMMA), polyvinyl acetate (PVAc) and polyurethane (PU).

In the method above-mentioned, the metal is select from at least one of silver, gold, copper, iron, aluminum, zinc and nickel.

Another purpose of this invention is to provide a nanometal polymer composite conductive film, which is manufactured by the method above-mentioned.

Thereby, the method for preparing the nanometal-polymer composite film as disclosed in this invention reduces the surface resistance of the polymer film efficiently.

BRIEF DESCRIPTION

DETAILED DESCRIPTION

To fully understand the purpose, feature and function of this invention, this invention is described as below by utilizing the preferred embodiments and the drawings:

Example 1

Step 1: adding and dissolving 9 g PVA in 171 g water (5%) at 80° C., stirring for about 1 hour to prepare a PVA aqueous solution.

Step 2: adding 1 g silver nitrate (AgNO$_3$) in the PVA solution prepared in step 1 and stirring for 30 min by magnetic bar to prepare a AgNO$_3$-PVA aqueous solution. (AgNO$_3$: PVA=1:9)

Step 3: coating evenly 1 g AgNO$_3$-PVA aqueous solution prepared in step 2 on the glass substrate and drying at 30° C. for 12 hr to prepare AgNO$_3$-PVA composite film.

Step 4: thermal treating the AgNO$_3$-PVA composite film prepared in step 3 at 100° C. for 0-168 hours. Silver ion was reduced to metal silver particle by thermal inducement to prepare silver nanoparticle AgNPs-PVA composite film.

Step 5: sintering the AgNPs-PVA composite film prepared in step 4 at 270° C. for 30 min to prepare an AgNPs-PVA composite film with surface conductive property.

Ultraviolet-visible sprectrophotometer can be utilized to monitoring the procedure of preparing the AgNPs-PVA composite film when it was prepared by using the PVA as a reducing agent and treating thermally and the silver ion is reduced to be a silver particle.

Figure 1:
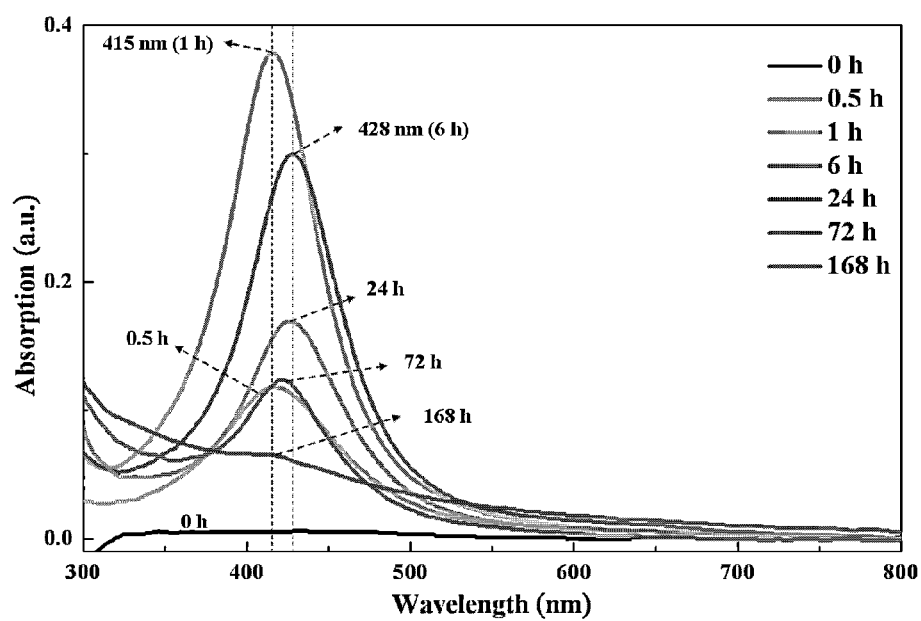
FIG. 1 shows the spectrogram of the AgNO$_3$-PVA composite film which is treated thermally at 100° C. in different time interval.

FIG. 1 shows the AgNO$_3$-PVA composite film, which was thermal treated at 100° C. and sampling at different interval (0-168 hours) and observed by ultraviolet-visible sprectrophotometer. No absorption peak was observed on the AgNO$_3$-PVA composite film, which has not treated thermally. It shows that no silver particle was reduced. After 10 min thermal treatment, a 415 nm absorption peak was observed showing that the silver ion was reduced to silver particle. As duration of thermal treatment was prolonged to 60 min, the intensity of the absorption peak at 415 nm was increased as the duration of the thermal treatment was prolonged. It shows that silver ion was reduced to silver particle continuously during the thermal treatment duration. The intensity of the absorption peak was increased as the amount of silver particles was increased. When the thermal treatment was proceeded continuously (3-168 hours), the absorption peak was shifted from 415 nm to 423 nm and intensity of the absorption peak was decreased as the duration of thermal treatment was prolonged. It can be observed that silver particles of the AgNPs-PVA composite film were aggregated or grown to be a larger particle at 100° C. Thus, the absorption peak was shifted and its intensity was decreased as the duration of the thermal treatment was prolonged.

Figure 2:
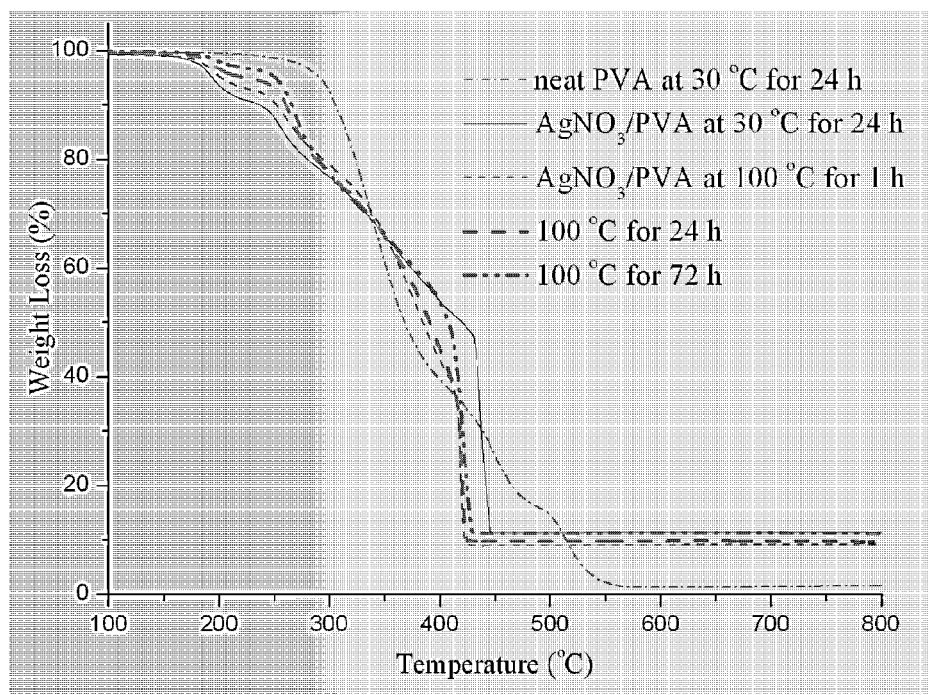
FIG. 2 shows the thermogravimetric analysis of AgNO$_3$-PVA composite film which is treated thermally at different time interval.

The sintering temperature can be selected by discussing the bonding between metal silver particles of the composite film increased at high sintering temperature and the PVA on the surface of the composite film pyrolyzed at high temperature. FIG. 2 shows a thermal gravimetric analysis (TGA) diagram of the AgNPs-PVA composite films which are treated thermally at different duration. As shown in FIG. 2, the T$_{d10}$ of the pure PVA film was 305° C. As the AgNO$_3$ was introduced, the T$_{d10}$ was decreased to 237° C. because of the PVA catalyzing cleavage. The silver ions were reduced to be silver particles when prolonging the duration of the thermal treatment. Thus, the concentration of the silver ion in the composite film was decreased and PVA catalyzing cleavage effect was also decreased. The T$_{d10}$ was increased from 252° C., which is treating thermally for 1 hour, to 265° C., which is treating thermally for 72 hours. Thus, the preferred sintering temperature is lower than the temperature of $T_{d10}$. The $T_{d10}$ of the AgPNs-PVA composite film after thermal treating for 72 hours was 265° C.; so the sintering temperature was selected to be 270° C. Thus, the purposes of the metal sintering effect and maintaining the completeness of the composite film were achieved.

Figure 3:
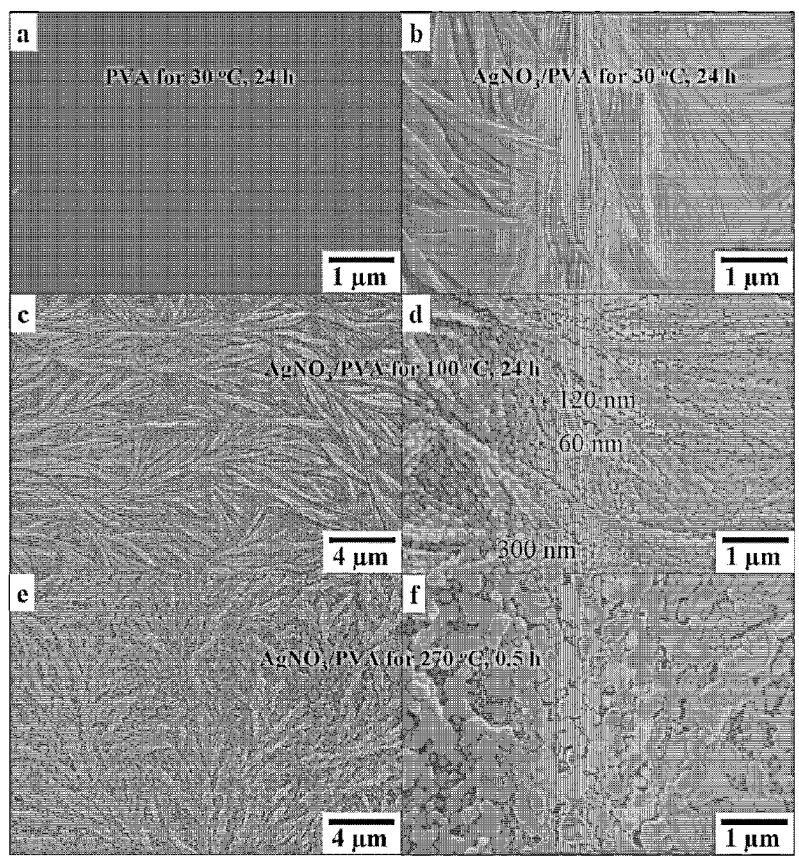
FIG. 3 shows SEM analysis of the surface feature of AgNO$_3$-PVA composite film which is treated thermally at different time interval.
Figure 4:
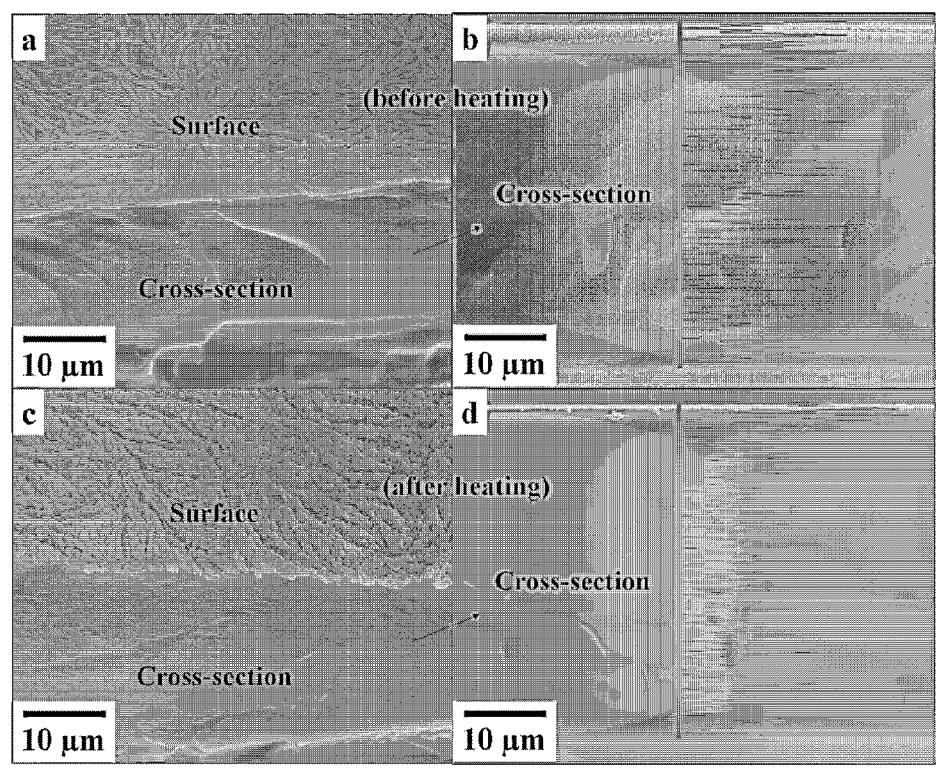
FIG. 4 shows SEM cross-sectional diagram the surface feature and the distribution of the silver concentration of the AgNO$_3$-PVA composite film which is before and after treated thermally at 100° C.

FIG. 3 shows a SEM diagram depicts the changing of the surface feature of the AgNO$_3$-PVA composite film at different thermal treatment duration. FIGS. 3a to 3d show the SEM diagram of the AgNO$_3$-PVA composite film which has been thermal treated and sampled at different time interval. When the AgNO$_3$-PVA composite film has not been treated thermally, there have no reduced silver particles on its surface, but special fern leaf arrangement has been observed. As the duration of the thermal treatment was increased to 1 hour, the silver particle has been already reduced on the surface of the AgNO$_3$ composite film. The particle size of the silver particle is 60 nm with ball shape. As the duration of the thermal treatment was increased to 24 hours, the size of the silver particle was grown to be 100 nm and the density of the silver particle was increased continuously. As the duration of the thermal treatment was increased to 72 hours, the size of the silver particle was increased to be 300 nm and the shape is irregular. FIGS. 3e to 3f show that SEM diagram of the surface feature of the AgNPs-PVA composite film which is sintering at 270° C. for 30 min FIG. 4 shows SEM cross-sectional diagram of the surface feature and the distribution of the silver concentration of the AgNO$_3$-PVA composite film before and after thermal treatment at 100° C., respectively. The bonding of the metal silver on its surface has been increased. Moreover, the silver concentration at the surface of the composite film is higher than that at the bottom. It proves that the silver particle will move upward when the temperature is increased. The resistance can be decreased efficiently when the surface of the composite film was covering the silver entirely and sintering at high temperature.

The surface resistance of the AgNO$_3$-PVA composite film, which was treating thermally at 100° C. and sampling at different time interval, was detected by using a four-point probe. Table 1 show the surface resistance of the AgNO$_3$-PVA composite film thermal treated at different time interval. The surface resistance of the pure PVA film and the AgNO$_3$-PVA composite film without thermal treating is greater than $2 \times 10^8$ ohm/sq since its surface does not cover by the metal silver. When the duration of the thermal treatment was prolonged to 24 hours, the silver particle reduced and formed on the surface of the composite film. However, the bonding between silver particles is not good enough because there still has PVA existing. Thus, the surface resistance can't be reduced efficiently, still grater than $2 \times 10^8$ ohm/sq. When the duration of the thermal treatment was prolonged to 72 hours, the surface resistance is reduced to $7.7 \times 10^6$ ohm/sq. Probably, that's because the bonding between silver particles, formed on the surface of the composite film, is increased. However, there still has some PVA existing; thus, only small amount of the surface resistance is reduced. Therefore, as the duration of the thermal treatment was prolonged, the silver particle on the surface of the composite film was grown to be a larger particle and generate the bonding between particles. The surface resistance is reduced thereby. However, since the non-conductive PVA still existing on the surface of the composite film, the reduction of the surface resistance is limited.

TABLE 1

| Composite film thermal treated at different temperature and duration | Surface resistance ($\Omega$/sq) | Surface resistance sintered at 270□ for 0.5 hour. ($\Omega$/sq) |
|---|---|---|
| Pure PVA film (30° C., 24 h) | $>2 \times 10^8$ | $>2 \times 10^8$ |
| AgNO$_3$-PVA composite film (100° C., 24 h) | $>2 \times 10^8$ | $>2 \times 10^8$ |
| AgNO$_3$-PVA composite film (100° C., 72 h) | $7.7 \times 10^6$ | $2.0 \times 10^0$ |
| AgNO$_3$-PVA composite film (100□, 168 h) | $5.2 \times 10^6$ | $1.0 \times 10^0$ |

Table 2 and Table 3 show the surface resistance of the AgNO$_3$-PVA composite film at different thickness and concentration. The surface resistance of the composite film was reduced to $1.0 \times 10^0$ ohm/sq at 30 nm thickness when it was treated thermally at 100□ for 72 hours and sintered for 270 hours. That's because the bonding of silver particles on the surface of the composite film make it become a continuous conductor. When the thickness of the composite film was controlled to be about 30 nm, the surface resistance can be reduced efficiently only when the proportion of AgNO$_3$ is 10-15 wt %. When the proportion of AgNO$_3$ is lower than 10 wt %, the amount of the reduced silver particles was too small to become a conductive path after sintering. However, when the proportion of AgNO$_3$ is higher than 50 wt %, the reduction of the surface resistance is limited because the PVA is not enough to reduce the silver particle. Thus, the conductive path cannot be formed after surface sintering. Thus, the surface resistance cannot be reduced efficiently.

TABLE 2

| Thickness of AgNO$_3$-PVA composite film (μm) | Surface resistance after treated thermally at 100□ for 72 hours ($\Omega$/sq) | Surface resistance after sintered at 270□ for 0.5 hour ($\Omega$/sq) |
|---|---|---|
| 10.3 | $>2 \times 10^8$ | $>2 \times 10^8$ |
| 18.5 | $>2 \times 10^8$ | $>2 \times 10^8$ |
| 29.6 | $7.7 \times 10^6$ | $1.0 \times 10^0$ |
| 35.0 | $8.0 \times 10^6$ | $2.4 \times 10^0$ |
| 45.0 | $4.5 \times 10^6$ | $3.0 \times 10^0$ |

TABLE 3

| Proportion of AgNO$_3$ to PVA | Surface resistance after treated thermally at 100□ for 72 hours ($\Omega$/sq) | Surface resistance after sintered at 270□ for 0.5 hour ($\Omega$/sq) |
|---|---|---|
| 1 wt % | $>2 \times 10^8$ | $>2 \times 10^8$ |
| 5 wt % | $>2 \times 10^8$ | $>2 \times 10^8$ |
| 10 wt % | $7.7 \times 10^6$ | $1.0 \times 10^0$ |
| 30 wt % | $9.0 \times 10^6$ | $8.4 \times 10^0$ |
| 50 wt % | $4.5 \times 10^6$ | $1.0 \times 10^0$ |
| 70 wt % | $>2 \times 10^8$ | $>2 \times 10^8$ |
| 90 wt % | $>2 \times 10^8$ | $>2 \times 10^8$ |

Example 2

A self-made LED device was used to test the conductive of the AgNPs-PVA composite film. It can be observed that the electric current can't pass through the PVA composite film, which has not treated by AgNO$_3$ thermal reduction. The LED can be turned on through the PVA composite film, which has been treated by AgNO$_3$ thermal reduction and sintered. Thus, it proves that the electric current pass through the AgNPs-PVA composite film which has been treated thermally as disclosed in this invention. Thus, the conductivity on the surface of the composite film is proved.

As above-mentioned, this invention meets three requirements of patentability: novelty, non-obviousness and industrial applicability. As for the novelty and non-obviousness, this invention provides a method for preparing a nanometal-polymer composite conductive film which dispenses with any reducing agent or dispersing agent but allows nanometallic particles to be formed in situ and thereby reduces surface resistance of the polymer film efficiently. As for the industrial applicability, the derivation products of this invention satisfy the requirement of the market.

While the present invention has been particularly shown and described with respect to preferred embodiments thereof, it will be understood by those skilled in the art that the embodiment only used to describe the present invention and not to limit the scope of the invention. It should be noted that any changes or replacement will fall within the scope of the present invention. Thus, the scope of present invention should be determined by appended Claims.

What is claimed is:

1. A method for preparing nanometal-polymer composite conductive film, comprising steps of:
    (1) mixing evenly a metal oxide with an organic polymer solution;
    (2) coating a substrate with a solution resulting from step (1), followed by drying the resultant solution to form a film;
    (3) performing thermal treatment on the film formed in step (2) to reduce the metal oxide to metal by the polymer, wherein a duration for thermal treatment is from 72 hours to 200 hours; and
    (4) sintering at high temperature the film thermally treated in step (3).

2. The method according to claim 1, wherein a proportion by weight of the metal oxide and the polymer is 1:99 to 50:50.

3. The method according to claim 1, wherein a proportion by weight of the polymer in the polymer solution is 10% to 20%.

4. The method according to claim 1, wherein the temperature for thermal treatment is from 50° C. to 150° C.

5. The method according to claim 1, wherein the temperature for sintering is from 250° C. to 350° C.

6. The method according to claim 5, wherein a duration for sintering is from 10 min to 60 min.

7. The method according to claim 1, wherein the polymer is selected from at least one of polyvinyl alcohol(PVA), polyethylene glycol(PEG), polyvinyl pyrrolidone(PVP), polyacrylonitrile(PAN), polyamide(PA), polyimide(PI), polyamide-imide(PAI), polyaniline(PANI), polyacrylic acid (PAA), polymethyl methacrylate(PMMA), polyvinyl acetate (PVAc), and polyurethane(PU).

8. The method according to claim 1, wherein the metal is select from at least one of silver, gold, copper, iron, aluminum, zinc and nickel.

* * * * *